Figure 1:
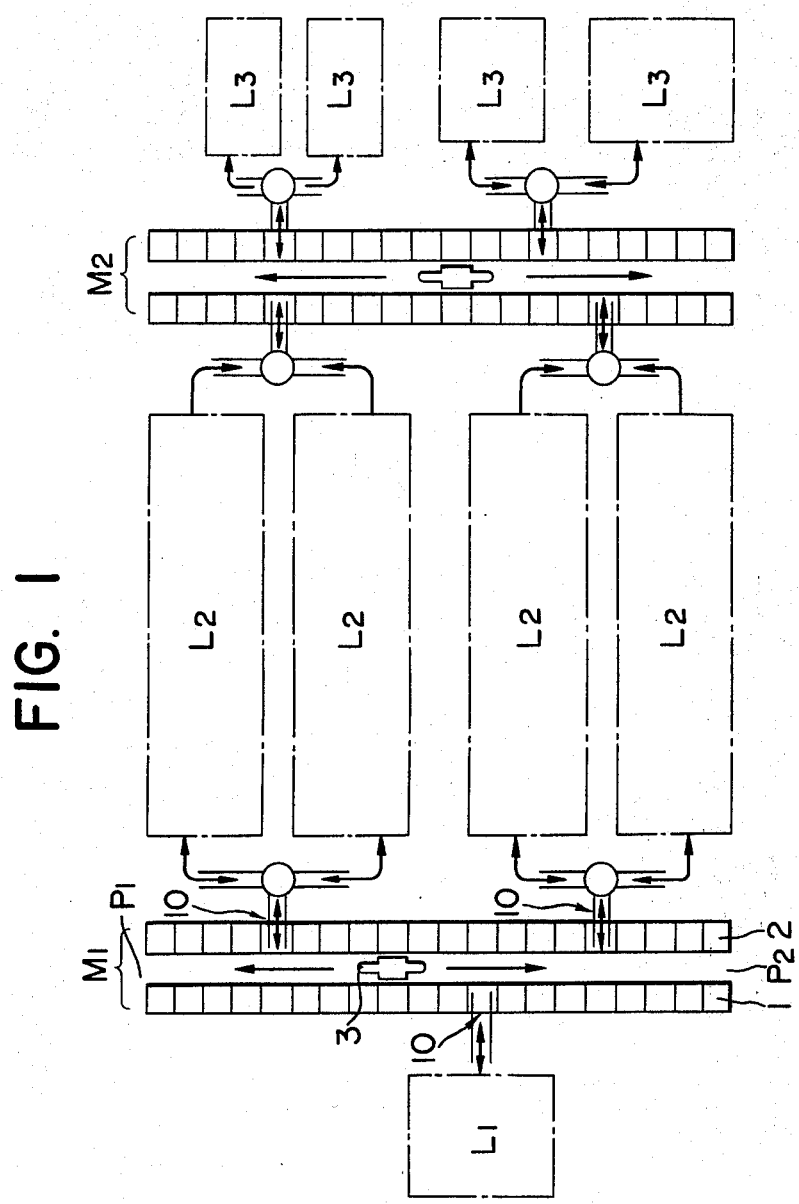

United States Patent [19]

Tamura et al.

[11] 3,995,752

[45] Dec. 7, 1976

[54] PRODUCTION LINES WITH LIFT VEHICLES, STACKER CRANES AND STORAGE MEANS BETWEEN THE LINES

[75] Inventors: Junnoshin Tamura; Hachirou Furubayashi, both of Osaka; Touji Higashio, Hakui, all of Japan

[73] Assignees: Kawasaki Heavy Industries, Ltd., Hyogo; Ichimura Sangyo Kabushiki Kaisha, Ishikawa, both of Japan

[22] Filed: Dec. 2, 1974

[21] Appl. No.: 528,613

[30] Foreign Application Priority Data

Dec. 5, 1973    Japan .......................... 48-135264

[52] U.S. Cl. ........................................ 214/16.4 A
[51] Int. Cl.² ........................................ B65G 1/06
[58] Field of Search ................ 214/16.4 A, 16.4 B, 214/16 B

[56] References Cited

UNITED STATES PATENTS

| | | |
|---|---|---|
| 3,430,308 | 3/1969 | Alsburg ...................... 214/16.4 A |
| 3,531,705 | 9/1970 | Rosin et al. .................. 214/16.4 A |
| 3,568,862 | 3/1971 | Walkhoff ..................... 214/16.4 A |
| 3,592,348 | 7/1971 | Atwater ....................... 214/16.4 A |
| 3,613,910 | 10/1971 | Weir ............................ 214/16.4 A |
| 3,622,020 | 11/1971 | Sarvary ....................... 214/16.4 A |
| 3,738,506 | 6/1973 | Cornford et al. ............. 214/16.4 A |
| 3,776,399 | 12/1973 | Atwater ....................... 214/16.4 A |
| 3,854,604 | 12/1974 | Peterson et al. ............. 214/16.4 A |

*Primary Examiner*—Frank E. Werner
*Assistant Examiner*—R. B. Johnson
*Attorney, Agent, or Firm*—John J. Byrne; Edward E. Dyson

[57]    ABSTRACT

A production facility has spaced production lines. A storage arrangement is located in the space between the production lines. Lift vehicles, movable on rails and turntables, are used to transfer articles from the production lines to an area of the storage arrangement. Stacker cranes are also used in the storage arrangement.

1 Claim, 2 Drawing Figures

PRODUCTION LINES WITH LIFT VEHICLES, STACKER CRANES AND STORAGE MEANS BETWEEN THE LINES

SUMMARY OF THE INVENTION

The object of the present invention is to provide an intermediate storage installation which improves the efficiency of the flow system of materials, half-worked products, and the like and to obtain space, time and movement savings. The invention also provides a safety storage-installation that is fully integrated in production lines.

The present invention has made it possible to provide an intermediate storage installation having a unique T-type layout by utilizing the advantages of recently developed three-dimensional automatic warehouses and adding the functions favorable as an intermediate storage installation to be placed between the production lines. A T-type layout mentioned signifies that the flowing direction of the materials and partially worked products being stored and delivered is arranged to be substantially at right angles to the longitudinal direction of storage racks.

The present invention relates to an intermediate storage installation in production lines of a manufacturing plant. For lack of a better expression, the stored materials which are moved from one production line to the other will be referred to as "workpieces."

Another object of the present invention is to provide an intermediate storage installation which improves the efficiency of the flow system of materials, half-worked products and the like and to obtain the efficient space, time and labor savings and to provide a safety storage-installation that is integrated completely in the production lines.

As is well known, warehouse installations for manufacturing plants have becme larger, three-dimensional, and automated. These large three-dimensional, automatic warehouses are equipped with flow racks, roller conveyors, stacker cranes and other automatic equipment.

However, to whatever extent such warehouses become larger and taller, their character remains the same. It can be fairly said that they are not designed to be used as intermediate storage installations that are incorporated in the production lines of plants, which is the principal objective of the present invention is to eliminate certain drawbacks of conventional, solid warehouses (for example, those having monorail, stacker crane and fixed rack systems) to be used as an intermediate storage installation disposed between the production lines.

In order to eliminate or reduce the drawbacks of conventional, ordinary warehouses when used as an intermediate storage installation, the present invention provides an intermediate storage installation having a unique T-type layout. The system utilizes the advantages of recently developed three-dimensional automatic warehouses adds favorable functions at intermediate storage installations between the production lines. The T-type layout mentioned herein signifies that the flowing direction of the workpieces being stored is arranged substantially at right angles to the longitudinal direction of storage racks.

Figure 2:
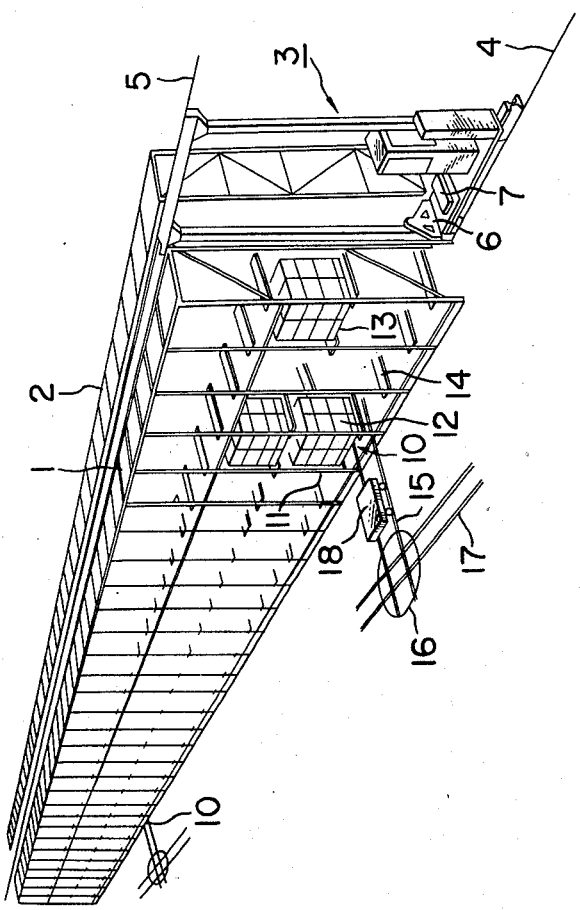

These and other objects of the invention will become more apparent to those skilled in the art by reference to the following detailed description when viewed in light of the accompanying drawings wherein:

FIG. 1 is a diagrammatic layout illustrating the embodiment of an apparatus for intermediate storage installation of the present invention; and FIG. 2 is a partial perspective view illustrating the gate device.

As shown in FIG. 1, intermediate storage installations $M_1$ and $M_2$ of the present invention are positioned between production lines $L_1$, $L_2$, $L_3$ in the direction (vertical direction in FIG. 1) and thus interrupt the transfer flow between the production lines. Each intermediate storage installation M has almost the same structure except that the number of gates is determined according to the demands of its adjacent production lines. The following description is made in regard to one storage installation, $M_1$.

Numerals 1 and 2 denote racks assembled with iron pipes and angle parts, or the like, and optionally designed according to the scale of production. Twenty sections are shown in the plan view of FIG. 1 with a three-stage shown in FIG. 2. A stacker crane 3 moves between both the racks on lower and upper guide rails 4 and 5 provided on the floor and under the ceiling (or rack frame). The crane can move goods to the shelves of the respective stages by a lift carriage 6. As the details of the construction are the same as those of well-known stacker cranes, its description is omitted. Although a fork device is provided to load and unload the goods at the respective shelf positions, the description of the fork lift will not be made other than its diagrammatic illustration.

As can be seen, one pair of racks 1 and 2 and the stacker crane 3 are capable of moving goods optionally to all the spaces between the two racks and constitute the solid storage installation unit M having the advantages of recent solid warehouses. However, the gates of conventional, solid storage installations coincide with points $P_1$ and $P_2$. This requires various transfer devices such as a hand carrier, fork lift, overhead traveling crane to carry materials, and the workpieces to the respective manufacturing equipment in each production line. This complicates the carrying routes and makes the passageway between the racks 1 and 2 the sole passage for the goods to be stored and delivered. To be strict, the traveling distance of goods in the exclusive passage is about 70% of the total length of the racks in the horizontal direction when consideration is taken of the height of the racks and the detour possibly taken to reach each point of production, the transfer distance is excessively long. An even more disadvantageous situation occurs when the longitudinal direction of the intermediate storage installation M is arranged in the direction of the production line (with the utilization factor of the floor space being considered independently in this case), or when the intermediate storage installation is disposed in a separate building.

The present invention provides a short and efficient transfer distance by arranging the respective storage positions of the workpieces with the production lines. Of course, the speed and quantity of material flow varies according to the production process, and, therefore, changes the number of shelf sections. The gate 10 in the drawing is the transfer short-cut most directly embodying the concept of this invention. Similar gates are provided on the external sides of the racks 1 and 2 on opposite sides of the stacker crane at appropriate places to cause the shortest possible distance between the production lines $L_1$ and $L_2$. In the illustration, one gate from the production line $L_1$ and two gates into the production line $L_2$ are provided at the shelves of the lowest stage of the intermediate storage installation $M_1$. The gate 10 is provided at a stage of optional height according to the relative position between the machine arrangement of the works and the rack. In the case of flowing goods from the production lines in a workshop to an adjacent workshop located on the lower or upper story, the intermediate storage installation M can be used as an intermediate storage installation for the workshops located above and below one another. In these instances the gate 10 is on the middle stage position of the intermediate storage installation. In this case, the intermediate storage installation also acts as the transfer unit between the workshops located in different stories with its own stacker crane. With storage equipment between spatially arranged production lines (as well as between production lines arranged on a same level) a more efficient transfer route of materials is provided. This contributes to production efficiency.

With regard to the transferring of the stored products through the gate 10 to the respective production lines (refer to arrows) and the products from the respective production lines to the next intermediate storage installation $M_2$ or returning to the same intermediate storage installation $M_1$ (refer to arrows), there are various methods. A simple description will be made in this regard in reference to the illustrated embodiment.

For example, goods 12 (normally moved on a pallet 13 of predetermined dimensions) are placed on the receiving shelves 14 at the lowest stage 11 of rack 1. The transferring rails 15 disposed under the receiving shelves 14 at gate 10 are connected through a turntable 16 to rails 17 which are parallel to the racks. The numeral 18 denotes a mobile truck with a lift mechanism (illustration omitted) which, after advancing through the gate 10, receives goods 12 from the receiving shelves 14 or directly from the fork 7 of stacker crane 3, and, being changed by the turntable 16 in direction, transfers the goods to rails 17 toward the production line for processing. The transfer from each production point to the intermediate storage installation for storage is performed in the operation reverse to the above.

A computer control system can be employed for the overall operation or manual operation may be made appropriately according to a production scale, but the description will be omitted since the control system itself is not within the scope of the present invention.

As seen by the foregoing description, the objectives of the present invention are realized by executing the unique T-type layout of the present invention, that is, with the intermediate storage installation between workshop production lines in a direction to traverse the goods flow whereby the gates deliver the goods in said storage installation to the adjacent production line to attain the shortest route to those production lines in the direction to form T-type branches to the storage installation. Furthermore, the stacker crane in this case not only performs the goods transfer to the optional shelf section in the storage installation and loading and unloading operation thereto, as characteristics of the conventional solid warehouse, but also can assume the transfer mechansim between production lines and moreover between workshops in different stories, and accordingly the storage installation can contribute to the further improvement of the production efficiency.

As a matter of course, the present invention can be executed in many variations without departing from the principles as described in the claims and, for example, it can be applied to said production lines located in the workshops of different stories or in mezzanines, or optional is partial application of continuous transfer system among the respective section shelves by the combined use of a flow rack having roll conveyors, or the transfer between a gate and each production point being made by suspension conveyor system with the use of an overhead monorail, etc. Furthermore, it is also possible to make a variation most suitable to production system and goods flow by making said gates versatile, for example, by designing rails removable or moving the suspension conveyor.

In a general manner, while there has been disclosed an effective and efficient embodiment of the invention, it should be well understood that the invention is not limited to such an embodiment, as there might be changes made in the arrangement, disposition, and form of the parts without departing from the principle of the present invention as comprehended within the scope of the accompanying claims.

We claim:
1. A production facility comprising a plurality of intermediate storage installation production lines comprising
a mobile vehicle with a lift means, interconnecting twin-track transfer rails disposed parallel to, and terminating at right angles with respect to, said intermediate storage installation, a turntable means positioned at said right angular termination point to facilitate directional change of said vehicle, whereby to permit said vehicle to transfer workpieces from said production lines to said intermediate storage installation by transversal of said interconnection transfer rails via said turntable means,
said production lines being disposed so as to create a space therebetween comprising said intermediate storage installation,
said installation comprising a pair of spaced shelf racks arranged parallel to one another in a direction perpendicular to the flow of workpieces between said production lines and said shelf racks defining a passageway therebetween and having first and second outer, longitudinal sides,
a plurality of shelves in each of said shelf racks,
a stacking crane in said passageway to move said workpieces to and from said pair of shelf racks,
a first side gate means disposed adjacent said first longitudinal side for delivering said workpieces to and from said shelves of said first shelf rack, and
a second side gate means disposed adjacent said second longitudinal side for delivering said workpieces to and from said shelves of said second shelf rack.

* * * * *